United States Patent

[11] 3,572,832

[72] Inventors James W. Graham;
Jonas Valukonis, Detroit, Mich.
[21] Appl. No. 850,714
[22] Filed Aug. 18, 1969
[45] Patented Mar. 30, 1971
[73] Assignee Ford Motor Company
Dearborn, Mich.

[54] VEHICLE PASSENGER RESTRAINT ASSEMBLY
10 Claims, 3 Drawing Figs.
[52] U.S. Cl. .................................................. 297/388,
297/385
[51] Int. Cl. ....................................................B60r 21/10,
A47c 31/00
[50] Field of Search ........................................... 297/385,
388; 280/150 (SB)

[56] References Cited
UNITED STATES PATENTS
3,295,862   1/1967   Ebert .............................. 297/385X
Primary Examiner—Francis K. Zugel
Assistant Examiner—James C. Mitchell
Attorneys—John R. Faulkner and E. Dennis O'Connor ABSTRACT: A restraint assembly enabling a vehicle passenger supported on a seat to engage plural lap belt restraining segments using only one of his hands. One of these segments is an elongated rigid member pivotally movable between a horizontal position along one side of the seat and an upright position. The other segment is a flexible belt secured to a belt retractor at the other side of the seat. The retractor is interconnected with the rigid member so that movement of the former as the flexible belt manually is pulled from the retractor to an extended position causes movement of the rigid segment from the horizontal to upright position wherein a fastener tongue formed on the rigid segment may be engaged by a buckle carried on the flexible belt.

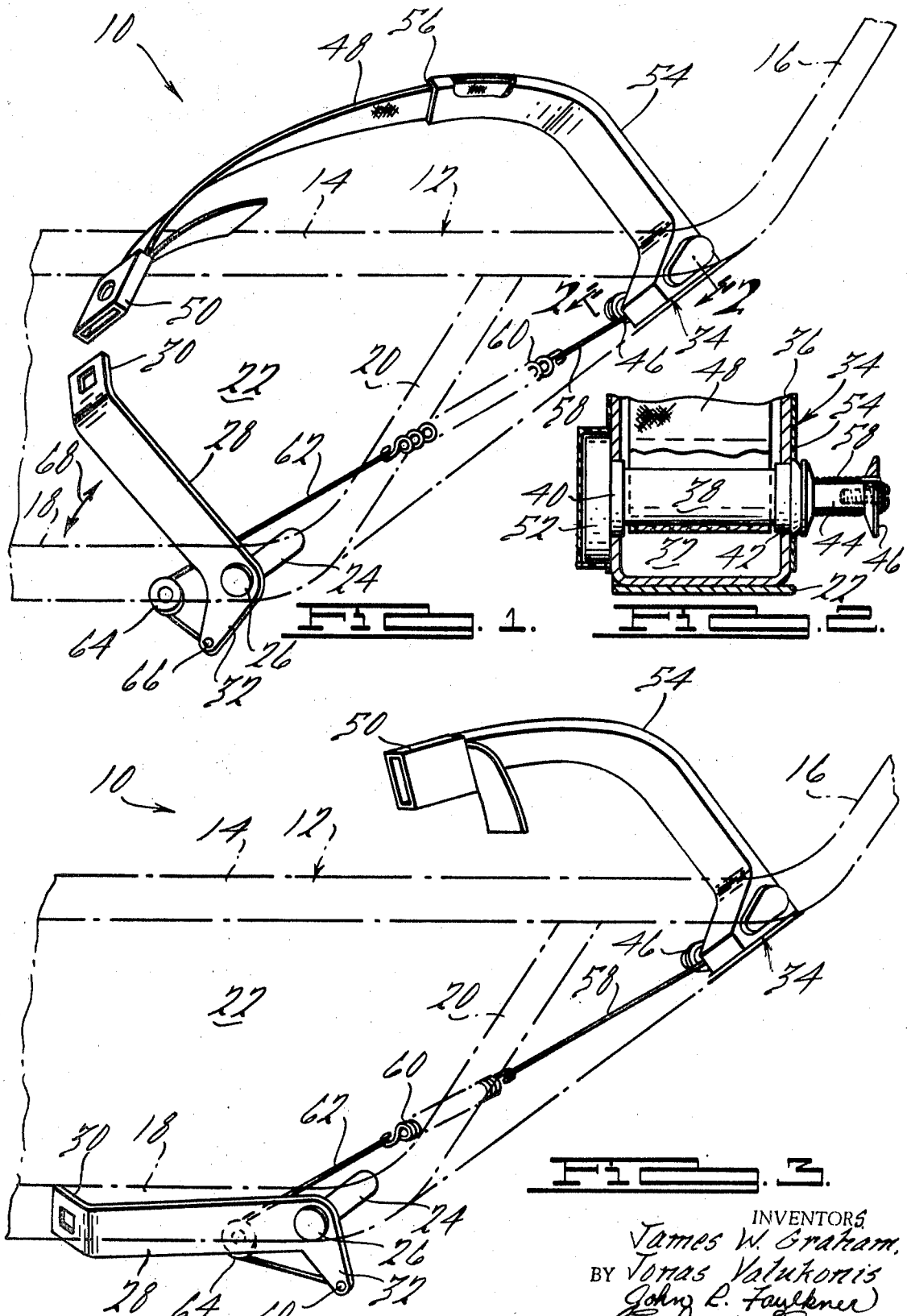

VEHICLE PASSENGER RESTRAINT ASSEMBLY

BACKGROUND OF THE INVENTION

Many types of motor vehicles are utilized for activities calling for the vehicle operators to leave the vehicle frequently to transport a burden to a delivery point. Examples of such vehicles are mail trucks and milk and package delivery vehicles. It is not uncommon for the operators of such vehicles to enter and leave the vehicles two hundred and fifty times or more during a working day.

It readily may be appreciated that such frequencies of ingress and egress occasion an inordinate expenditure of time by vehicle operators fastening and unfastening conventional safety lap belts. Factors contributing to delays attributable to seat belt manipulation are the necessity of using two hands to fasten the belt segments together and the time necessary to locate conventional belt segments and retrieve these segments from their unused positions along the sides of or between vehicle seats.

It is an object of this invention to provide a multiple segment vehicle passenger restraint assembly having an operative position wherein it will function to restrain a vehicle passenger against movement in a manner identical to a conventional lap belt arrangement, but that easily may have its segments fastened and unfastened in a reduced period of time compared to a conventional lap belt arrangement. The passenger restraint assembly of this invention thus particularly is adapted for inclusion in motor vehicles utilized for tasks requiring frequent ingress and egress by the vehicle operator bearing a burden. Manipulation of this restraint assembly between operative and inoperative positions may be accomplished easily and quickly and requires the use of only one of the vehicle operator's hands, thereby increasing the efficiency of the vehicle operator as he goes about the performance of his duties.

SUMMARY OF THE INVENTION

A vehicle passenger restraint assembly constructed in accordance with this invention is adapted to be utilized in a motor vehicle having body structure defining a passenger compartment and forward facing passenger seat means located within the compartment. This restraint assembly is adapted to restrain movement of a seated vehicle passenger supported by said seat means and includes an elongate, rigid member pivotally mounted within the passenger compartment on the outboard side of the seat means. This rigid member is movable from a horizontal position wherein it lies along the side of the seat means near the passenger compartment floor to a substantially upright position. A belt fastener tongue means is carried by the rigid member and is located at the uppermost extremity of the rigid member when the rigid member is in the upright position. Movable belt segment retractor means are mounted by the inboard side of the seat means. Flexible belt segment means are secured to the retractor means and are movable relative thereto between an extended position and a stored position wherein at least a portion of the belt segment is wound on the retractor means. Belt fastener buckle means are carried by the belt segment means and are adapted to engage releasably the tongue means. Connecting means interconnect the retractor means and the rigid members. Whenever the belt segment is manually urged into the extended position, causing a following movement of the retractor means, these connecting means urge the rigid member into the upright position. The connector means also provide that the rigid member returns to the horizontal position when the belt segment is positioned into the stored position and is partially wound on the retractor means.

DESCRIPTION OF THE DRAWING

FIG. 1 is an isometric view, including a schematic representation of vehicle seat structure, illustrating the passenger restraint assembly of this invention with parts in positions proximate the fully operative positions of these parts;

FIG. 2 is a partial sectional view taken along the line 2—2 of FIG. 1; and

FIG. 3 is a view similar to FIG. 1 but showing the parts of the restraint assembly in inoperative positions.

DETAILED DESCRIPTION OF THE INVENTION

Referring now in detail to the drawings and in particular to FIGS. 1 and 3, the numeral 10 denotes generally a vehicle passenger restraint assembly constructed in accordance with this invention. This assembly is adapted to be mounted proximate a forward facing vehicle seat located within a vehicle passenger compartment. The frame 12 of such a seat is illustrated schematically in the drawing and includes an inboard structural side rail 12 having a substantially upright portion 16. An outboard structural side rail 18 includes a substantially upright portion 20. It is to be understood that these structural rail members normally are covered with cushion structure including padding and an upholstery covering that have been removed for purposes of clarity in the drawing. The horizontal portions of side rails 14 and 18 support the horizontal seat cushion while the upright rail portion 16 and 20 support the seat back structure. These seat structural members are mounted on the floor 22 of the vehicle passenger compartment.

A pivot shaft 24 having an enlarged head portion 26 is secured to side rail 18 and pivotally mounts an elongated rigid member 28. Member 28 may be formed from a thin plate of steel and may have a decorative coating of any type desired. The end of rigid member 28 is remote from pivot shaft 24 and is slightly inclined angularly toward the seat structure and has formed thereon the tongue portion of a conventional buckle-type fastener. Proximate the pivot shaft 24, a crank arm portion 32 of rigid member 28 extends angularly with respect to the longitudinal axis of the rigid member.

On the side of the seat frame 12 opposite the pivot shaft 24, that is, on the inboard side of the seat frame, a belt segment retractor generally denoted by the reference numeral 34 is secured to the passenger compartment floor 22. The details of the construction of retractor 34 may be seen in FIG. 2 of the drawing wherein the numeral 36 denotes a box-shaped main body defining a central chamber 37 that is open at its top. A spool 38 extends through chamber 37 and has formed integrally therewith enlarged portions 40 and 42. These enlarged portions are journaled in the sidewalls of main body 36 thus providing for a rotational mounting of spool 38. An elongate projection 44 extends from the enlarged portion 42 of spool 38 to exterior of the main body 36. The significance of the projection 44 will be elaborated upon in detail below.

A belt segment 48 made of conventional flexible webbing is secured to the spool 38 and is adapted to be wound thereupon in the usual manner. Belt segment 48 carries a conventional seat belt buckle 50 adapted to receive and releasably engage the tongue formed on the end 30 of the rigid member 28. A flat coil spring 52 (FIG. 2) located exterior of chamber 37 operatively is connected to enlarged portion 40 of spool 38 and exerts a force tending to rotate spool 38 to wind belt segment 48 upon the spool, thus drawing buckle 50 toward the retractor 34.

Movement of buckle 50 toward the retractor 34 due to the force of spring 52 is limited due to the presence of a rubber boot 54. Boot 54 is a sleevelike element constructed of relatively stiff material such as hard rubber or plastic. Boot 54 surrounds retractor 34 and a portion of the length of belt segment 48 proximate retractor 34. The sleevelike configuration of boot 54 allows the belt segment 48 to be arranged such that it extends through the boot 54. Thus, when the force of spring 52 acts on spool 38 to wind belt segment 48 upon the spool, this winding is terminated when belt buckle 50 is drawn into contact with the end surface 56 of boot 54. The stiff consistency of the material of boot 54 causes the boot to hold belt buckle 50 in the elevated position shown in FIG. 2, such that it readily is available to be grasped by the right hand of the vehicle operator supported on the passenger seat.

A length of cable 58 is secured to spool projection 44 and is adapted to be wound therearound. The end of cable 58 remote from spool projection 44 is secured to one end of a coil spring 60 that is located between seat side rails 14 and 18 beneath the seat cushion. The other end of spring 60 is connected to a second length of cable 62 that extends around a rotatable pulley 64 that is secured to side rail 18. Cable 62 is secured at point 66 to the crank arm portion 32 of rigid member 28.

The operation of the vehicle passenger restraint assembly described above is as follows. When the restraint elements, comprising rigid member 28 and belt segment 48, are not in use, all parts are in the position shown in FIG. 3 of the drawing. Belt buckle 50 is drawn by the force of spring 52 towards retractor 34 until it abuts end 56 of boot 54. Elongate member 28 has fallen, due to the force of gravity, into the substantially horizontal position illustrated such that it lies along the outboard side of the vehicle seat. With the member 28 in the position illustrated in FIG. 3, it readily may be appreciated that a vehicle operator supported in the forward facing passenger seat easily may enter and leave the vehicle passenger compartment without interference due to the member 28.

Upon the vehicle operator being supported in the forward facing seat, movement of the elements of the passenger restraint assembly of the invention into an operative condition easily may be accomplished by the performance by the operator of a manual task requiring only one hand. The operator need only grasp the belt buckle 50 with his right hand and pull the belt buckle across his body such that belt segment 48 is in the extended position shown in FIG. 1. As the belt segment 48 is pulled from the stored to the extended position, spool 38 is rotated against the force of spring 52. This movement causes a rotation of the spool projection 44 so that cable 58 is wound upon the projection 44. This effective shortening of the cable 58 causes an elongation of spring 60 as shown in FIG. 1 of the drawing. Spring 60 thereupon exerts a force tensioning cable 62, which force is applied to the crank arm portion 32 of member 28. This force causes member 28 to be rotated in a clockwise direction about the pivot arm 24 such that member 28 assumes the position shown in FIG. 1. Movement of member 28 from the horizontal position of FIG. 3 to the upright position of FIG. 1 and back again to the horizontal position is illustrated by the arrow 68 in FIG. 1.

After the belt buckle 50 is drawn across the body of the vehicle operator it easily may be positioned to receive the tongue element formed on end 30 of member 28. Member 28 and belt segment 48 thus comprise a pair of cooperating restraint segments that will restrain forward movement of a seated passenger during rapid deceleration of the vehicle.

When it is desired to terminate utilization of the passenger restraint assembly of this invention, the vehicle operator need only use his right hand to unlatch the buckle 50 from the tongue formed on end 30 of member 28. The force of spring 52 will cause belt segment 48 to be wound upon the spool 38 until buckle 50 abuts the end 56 of boot 54. The rotation of spool 38 that occurs at this time will cause cable 58 to be unwound from projection 44 as spring 60 moves to the relaxed position of FIG. 1. The tensioning force on cable 62 thus is removed and elongate member 28 returns to the horizontal position due to the force of gravity.

It thus may be seen that this invention provides a vehicle passenger restraint assembly that manually may be manipulated by a vehicle passenger from an inoperative position to an operative position by the performance of a simple task with one of the vehicle passenger's hands. This task may be performed easily and quickly so that the vehicle passenger may enter and leave the vehicle with great frequency without occasioning time consuming manipulations of the passenger restraint assembly.

We claim:

1. In a motor vehicle having body structure defining a passenger compartment and forward facing passenger seat means located within said compartment, a safety lap belt assembly for restraining movement of a vehicle passenger supported by said seat means, said assembly comprising: an elongate rigid member pivotally mounted within said compartment on one side of said seat means and movable from a horizontal position along the side of said seat means to an upright position, belt fastener tongue means carried by said rigid member and located at the uppermost extremity of said member when said member is in the upright position, movable belt segment windup means mounted on the other side of said seat means, flexible belt segment means secured to said windup means and movable relative thereto between an extended position and a stored position wherein at least a first portion of said belt segment is wound on said windup means, belt fastener buckle means carried by said belt segment means and adapted to releasably engage said tongue means, and connecting means interconnecting said windup means and said rigid member and urging said rigid member into said upright position when said belt segment is manually positioned in the extended position.

2. The combination of claim 1, wherein said rigid member is located on the outboard side of said seat means.

3. The combination of claim 1, including resilient means exerting a force on said windup means urging said windup means towards a position wherein said belt segment means are in the stored position.

4. The combination of claim 1, further comprising rigid belt segment boot means surrounding a portion of the length of said belt segment proximate said windup means, said boot means maintaining a second portion of said belt segment in an upwardly extending orientation when said belt segment is in the stored position.

5. In a motor vehicle having body structure defining a passenger compartment and forward facing passenger seat means located within said compartment, a passenger restraint assembly for restraining movement of a vehicle passenger supported by said seat means, said assembly comprising: an elongate rigid restraint segment pivotally secured proximate one of its ends within said passenger compartment at one side of said seat means and swingable in a substantially vertical plane between a horizontal position along the side of said seat means and an upright position, a flexible restraint belt segment operatively secured to belt segment retractor means mounted on the other side of said seat means, said flexible belt segment being manually movable between a retracted condition wherein a portion of said flexible belt segment is collected by said retractor means and an extended condition wherein said flexible belt segment may be positioned across said seat means and in proximity with said rigid restraint segment, linkage means including said retractor means interconnecting said flexible and rigid segments such that movement of the former causes following movement of the latter, and cooperating fastening means carried by said flexible and rigid segments and releasably engageable when said flexible segment is in the extended position.

6. The combination of claim 5, wherein said rigid segment is mounted on the outboard side of said seat means.

7. The combination of claim 6, wherein said fastener means comprise a fastener tongue mounted on said rigid segment and a fastener buckle carried on said flexible segment.

8. The combination of claim 6, wherein said linkage means interconnect said segments such that said rigid segment is in the upright position when said flexible segment is in the extended condition and said rigid segment is in the horizontal position when said rigid segment is in the retracted condition.

9. The combination of claim 6, further including resilient means exerting a force on said flexible segment through said retractor means, said force urging movement of said flexible segment towards the retracted condition.

10. The combination of claim 9, wherein said flexible segment has a buckle secured thereto, and rigid boot means surrounding a portion of said flexible segment and bearing on said buckle to maintain said buckle in a spaced-apart position away from said retractor means when said flexible segment is in the retracted condition.